United States Patent
Snell et al.

(10) Patent No.: US 7,984,599 B2
(45) Date of Patent: Jul. 26, 2011

(54) HIDDEN DECKING FASTENER AND RELATED METHOD OF FASTENING DECK BOARDS

(75) Inventors: Denby Snell, Overland Park, KS (US); David DeRogatis, Brick, NJ (US); Steve Kiso, Kearney, MO (US); Scott Rega, Overland Park, KS (US); David Porter, Huntsville, AL (US); Scott Nowatzki, Mission, KS (US); Dave Fancher, Southlake, TX (US); Greg Zimmerman, Dallas, TX (US)

(73) Assignee: Building Materials Investment Corporation, Wilmington, DE (US)

( * ) Notice: Subject to any disclaimer, the term of this patent is extended or adjusted under 35 U.S.C. 154(b) by 46 days.

(21) Appl. No.: 11/843,427

(22) Filed: Aug. 22, 2007
(Under 37 CFR 1.47)

(65) Prior Publication Data

US 2010/0257806 A1    Oct. 14, 2010

Related U.S. Application Data

(60) Provisional application No. 60/828,747, filed on Oct. 9, 2006.

(51) Int. Cl.
*E04B 5/02* (2006.01)
(52) U.S. Cl. ...................... 52/586.1; 52/650.3; 52/747.1
(58) Field of Classification Search .................. 52/489.1, 52/489.2, 512, 584.1, 586.1, 650.3, 713, 52/715, 765, 747.1; 411/457, 469; 24/289, 290, 291, 292; 403/388, 389
See application file for complete search history.

(56) References Cited

U.S. PATENT DOCUMENTS

| | | | | | |
|---|---|---|---|---|---|
| 1,819,156 | A | * | 8/1931 | Fenton | 24/623 |
| 1,948,462 | A | * | 2/1934 | Le Page | 24/581.11 |
| D295,496 | S | * | 5/1988 | Burke et al. | D8/394 |
| 4,744,187 | A | * | 5/1988 | Tripp | 52/410 |
| 5,063,722 | A | * | 11/1991 | Hohmann | 52/410 |
| 5,250,058 | A | * | 10/1993 | Miller et al. | 606/154 |
| 5,314,427 | A | * | 5/1994 | Goble et al. | 606/232 |
| 7,052,200 | B2 | * | 5/2006 | Harris | 403/231 |

* cited by examiner

*Primary Examiner* — Brian E Glessner
*Assistant Examiner* — Christine T Cajilig
(74) *Attorney, Agent, or Firm* — Baker & McKenzie LLP

(57) ABSTRACT

Fasteners, and related methods, for securing deck boards to a support joist are disclosed. In one embodiment, the fastener comprises a base portion and a cap portion on the base portion. In some embodiments, the base portion includes an opening formed therethrough for receiving a securing device, and legs extending from an upper surface of the base portion and between edges of adjacent deck boards to define a spacing between the adjacent deck boards. The cap portion can include an opening for receiving the securing device therethrough to secure the fastener to the support joist. In addition, the cap portion may include legs extending around the base portion and comprising teeth extending therefrom that bite into grooves formed in the edges of the adjacent deck boards when the securing device secures the fastener to the support joist, thereby securing the deck boards to the support joist.

19 Claims, 4 Drawing Sheets

HIDDEN DECKING FASTENER AND RELATED METHOD OF FASTENING DECK BOARDS

PRIORITY CLAIM AND RELATED APPLICATION

This application claims the benefit of U.S. Provisional Application Ser. No. 60/828,747, filed on Oct. 9, 2006, and entitled "Sabre Clip" and which is commonly assigned with the present disclosure and incorporated herein by reference in its entirety for all purposes.

TECHNICAL FIELD

Disclosed embodiments herein relate generally to fasteners for use with decking systems, and more particularly to hidden decking fasteners, and related methods for fastening deck boards.

BACKGROUND

Decks and other outdoor structures are becoming increasingly popular as homeowners spend more time outside of their homes. Decking assemblies typically include horizontal floors raised above the ground. Often such decking assemblies are attached adjacent to residential and commercial buildings. Other uses for such decking assemblies are boardwalks, boat docks, stairs, benches and bridges. Such decking assemblies are often formed from a substructure formed with joists and headers. Several deck boards are then transversely fixed across the joists of the sub-frame, in a generally parallel relationship, by way of nails or screws driven through the top surface of the boards.

The use of nails with wooden deck boards in conventional decking assemblies, however, exhibits several shortcomings, such as compromised structural integrity, difficulty in assembly, and limited aesthetic appeal. For example, with hammering it is easy to miss the head of the nail and cause unsightly dents and scratches on the top surface of the boards. Additionally, both nails and screws are prone to rusting, thus discoloring the top surface of the boards and weakening the nail. This, in turn, compromises the structural integrity of the decking assembly. Also, nails and screws have the tendency to cause wood to split, and to work up from their placements when stressed, further compromising the structural integrity of the decking assembly. Moreover, it is difficult to achieve a uniform spacing for each deck board.

Other shortcomings of conventional wood decking assemblies include the vulnerability of wood to dramatic climate changes. This results in the constant expansion and contraction of conventional wood decking assemblies, which often causes cracking and weakens the entire structure. Additionally, the appearance of nails and screws from the top of the deck boards of conventional decking assemblies results in an aesthetically displeasing appearance. Equally as significant, the use of nails or other fasteners driven into wood boards makes disassembly and repairs of decking assemblies difficult. As such, disassembled boards typically include nail markings and holes from previous assembly, and are not easily re-used. In assemblies that employ screws instead of nails, pre-drilling of the decking boards could be done to avoid wood splitting and other problems, but this adds further time and expense to the decking project.

Additionally, homeowners are also building more elaborate and expensive decks. Because of the expense involved in such decks, customers often do not want to be limited to conventional "soft" lumber for the primary deck boards and other decking structures. Specifically, the beauty and lifespan of soft lumber products can be significantly less than hardwoods, such as cumaru and Brazilian walnut, and modern synthetic materials, such as weatherproof composite. Unlike conventional treated lumber deck boards, which are typically nailed or screwed to underlying joists as described above, hardwood deck boards and composite deck boards are typically secured with alternative fastening means.

For example, clip-on boards have been proposed as an alternative to nails. These deck boards are usually shaped in such a way as to dictate only one manner of installation. This asymmetry can cause problems with installation and maintenance, when later needed. Additionally, clip-on boards are typically not secure and can be removed without any tools, making them structurally weak. Similarly, tongue and groove deck boards have been proposed to be used in association with anchor clips that bend into place. However, this often results in a weaker structure with clips that are susceptible to rust and loosening. Moreover, tongue and groove assemblies typically do not allow for drainage of water, that accompanies a typical freeze and thaw cycle.

In view of the problems associated with these alternative techniques for deck assembly, hidden fasteners have gained popularity for composite and hardwood decks. Hidden fasteners or clips provide a more finished appearance free of visible nail and screw holes. Such hidden fasteners are typically inserted into pre-cut or biscuit jointer slots formed in the edges of the deck boards, and then screwed to the underlying joists to hold the deck boards against the joist. Unfortunately, conventionally available deck fasteners and clips suffer from several limitations that limit their utility. For example, many conventional fasteners are constructed of brittle materials and easily break when installed if over-tightened. Even if such fasteners do not break during installation, they often do not provide significant holding force for the deck boards, which may result in loose deck boards over time. Conventional deck fasteners are also often difficult to install and do not effectively grip the deck boards, often causing the boards to shift relative to one another, especially over time, resulting in uneven gaps between the deck boards. Accordingly, an improved hidden deck fastener, and related method of assembling a deck, that is desirable that does not suffer to shortcomings of known decking assemblies techniques.

SUMMARY

Disclosed herein are hidden deck fasteners and related methods for attaching deck boards to underlying joists during deck assembly. The disclosed fasteners provide more effective way to secure boards to support joists without having to face fasten the boards.

In one embodiment, a fastener for securing slats to a support is disclosed. In such embodiments, the fastener comprises a base portion and a cap portion on the base portion. In some embodiments, the base portion includes an opening formed therethrough for receiving a securing device, and legs extending from an upper surface of the base portion and between edges of adjacent slats to define a spacing between the adjacent slats. The cap portion can include an opening for receiving the securing device therethrough to secure the fastener to the support. In addition, the cap portion may include legs extending around the base portion and comprising teeth extending therefrom that bite into grooves formed in the edges of the adjacent slats when the securing device secures the fastener to the support, thereby securing the slats to the support.

In another embodiment, a method of securing slats to a support is provided. For example, the method may comprise laying slats to be secured to a support adjacent to one another, wherein the edges of the slats have grooves formed therein. In addition, the method may include providing a fastener for securing the slats to the support. The fastener may comprise a base portion including an opening formed therethrough for receiving a securing device, and legs extending from an upper surface of the base portion. The fastener may also comprise a cap portion on the upper surface of the base portion, where the cap portion includes an opening for receiving the securing device therethrough, and legs extending around the base portion and comprising teeth extending therefrom. Furthermore, the method may include placing the extending legs of the base portion between edges of the adjacent slats to define a spacing between the adjacent slats, while positioning the legs of the cap portion within the grooves formed in the edges of the slats. Then, the method in such an embodiment includes inserting the securing device through the openings in the cap portion and in the base portion, and driving the securing device into the support and thereby against the cap portion to cause the teeth to bite into inner surfaces of the grooves to secure the slats to the support.

Another embodiment of a fastener for securing deck boards to a support joist is also disclosed. In such an embodiment, the fastener comprises a base portion having an opening formed therethrough for receiving a securing device, and legs extending from an upper surface of the base portion and between edges of adjacent deck boards to define a spacing between the adjacent deck boards. The legs may further provide a crush zone between the edges of the adjacent deck boards configured to partially collapse when the adjacent deck boards shift towards each other. In addition, the fastener may include a cap portion on the upper surface of the base portion, the cap portion having an opening for receiving the securing device therethrough to secure the fastener to the support joist. The cap portion may also include legs extending around the base portion and comprising teeth extending therefrom that bite into grooves formed in the edges of the adjacent deck boards when the securing device secures the fastener to the support joist. The cap portion may still further comprise a reinforced area on the cap portion to resist flexing of the cap portion when the securing device secures the fastener to the support joist.

BRIEF DESCRIPTION OF THE DRAWINGS

For a more complete understanding of this disclosure, and the advantages of the systems and methods herein, reference is now made to the following descriptions taken in conjunction with the accompanying drawings, in which.

DETAILED DESCRIPTION

This disclosure relates, in some embodiments, to decking material and a more effective way to secure this type of material to an underlying super structure without having to face fasten the decking boards. Specifically, disclosed is a deck board fastener for securing two boards to a support joist and related methods of securing such boards to a support joist. In other embodiments, the fasteners and associated methods of fastening may be used in broader applications, such as the securing of any slats or similar items to a support. As such, although the below description is provided in terms of decking boards and decking assemblies, it should be noted that the disclosed principles may be applied to the securing of any items to a supporting item or structure.

Figure 1:
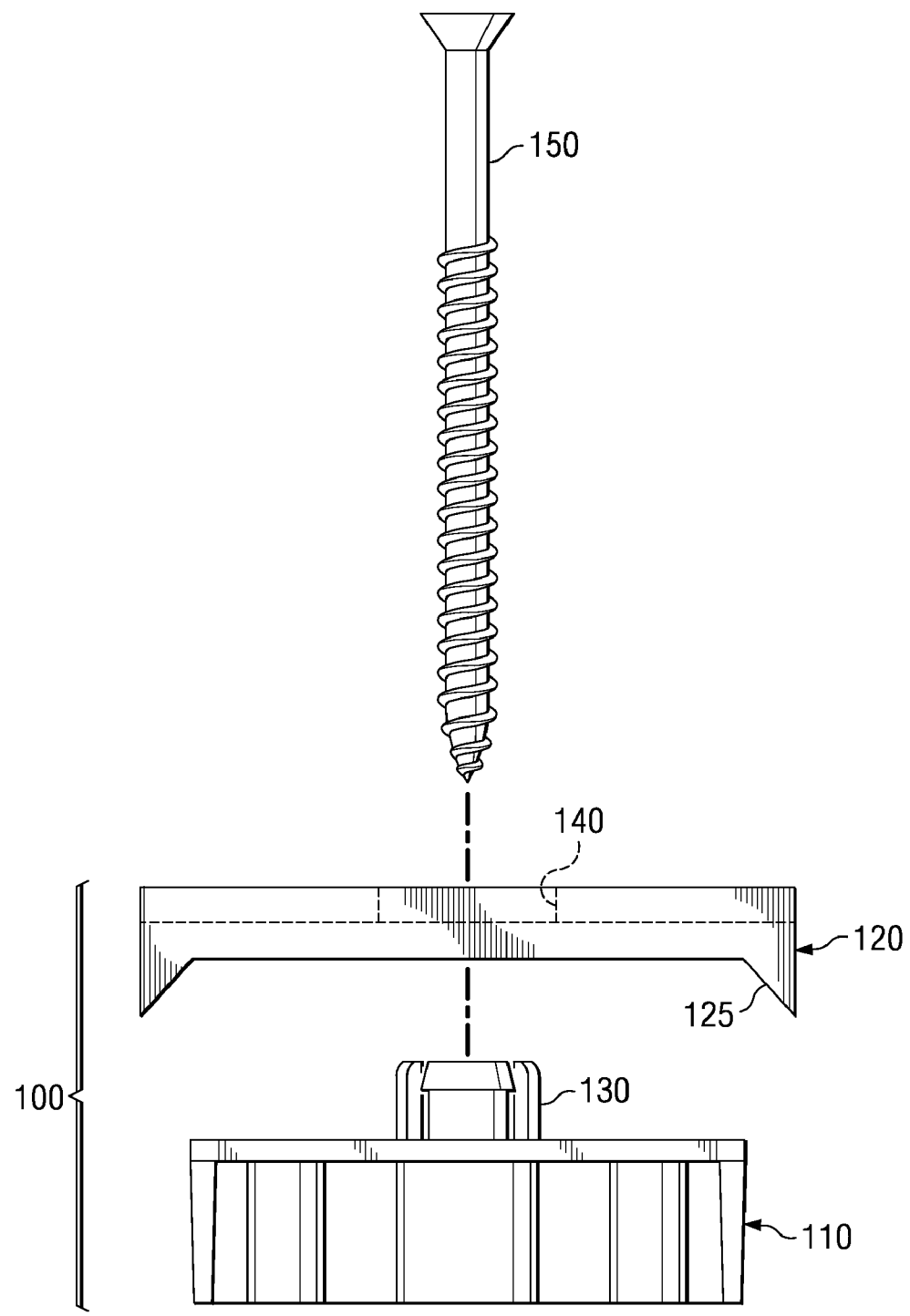
FIG. 1 illustrates an exploded side view of one embodiment of a deck board fastener 100 constructed according to the disclosed principles.

FIG. 1 illustrates an exploded side view of one embodiment of a deck board fastener 100 constructed according to the disclosed principles. The fastener 100 includes two portions: a base portion 110 and a cap portion 120. In an advantageous embodiment, the base portion 110 comprises a vertical T-shape, and the cap portion 120 comprises a U-shaped cap 120 with teeth 125 extending downward from each end and/or corner of the cap portion 120. As discussed in further detail below, the cap portion 120 is configured to be placed over the base portion 110, such that an extension 130 from the base portion 110 passes through an opening 140 in the cap portion 120 to secure the cap portion 120 to the base portion 110. A screw 150 or other type of securing device is used for securing the deck fastener 100 to a deck joist, thereby causing the fastener 100 to secure the decking boards to the deck joists.

Figure 2:
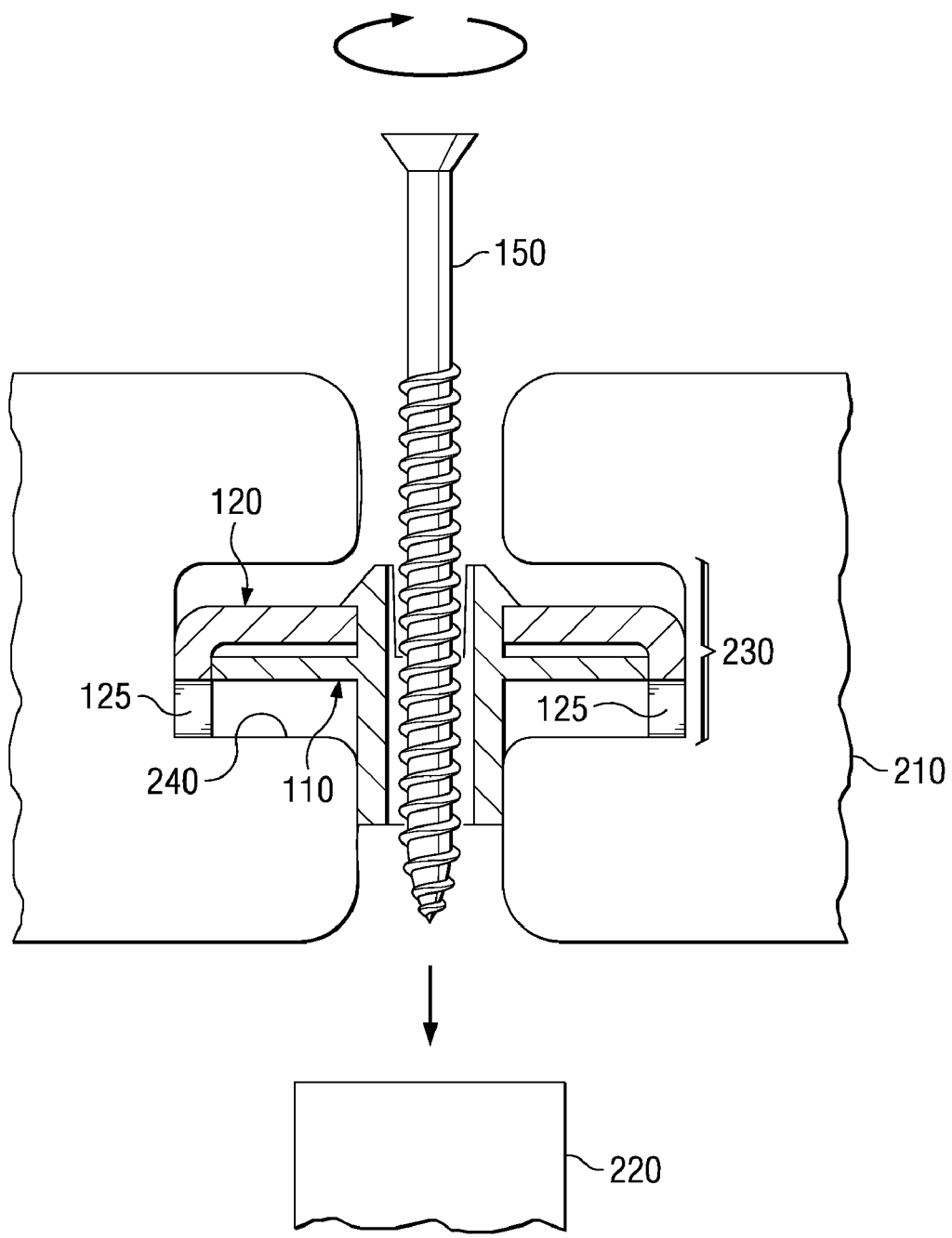
FIG. 2 illustrates a front view of the fastener shown in FIG. 1 during its use to secure decking boards to an underlying support joist.

FIG. 2 illustrates a front view of the fastener 100 shown in FIG. 1 during its use to secure decking boards 210 to a joist 220. Specifically, to secure the decking boards 210 to the joist 220, the cap portion 120 is inserted into grooves 230 formed into edges of adjacent decking boards 210. For example, such grooves 230 may be the size and shape designed to receive a "biscuit," but the fastener 100 may also fit into other shaped grooves 230. As the screw 150 is tightened into the joist 220 and down on the fastener 100, the teeth 125 will bite into the lower internal surface 240 of each groove 230. By biting into the decking boards 210, the outward teeth 125 are designed to resist movement and/or minimize expansion and contraction of the boards 210.

The width of the cap portion 120 may also provide for uniform spacing of the deck boards 210 being installed. Specifically, during installation of the deck boards 210, the inner most edges of the grooves 230 in the deck boards 210 can be pressed up against the outer edges of the cap portion 120, thus maintaining substantially the same spacing between the deck boards during installation. Moreover, the adjacent decking boards 210 may be laid parallel to each other along their lengths, or perhaps laid perpendicular (or in other orientations) to each other, with the grooves 230 formed in either the side edges or end edges of the decking boards 210, as each application requires. Accordingly, the disclosed fastener 100 and associated methods of fastening may be used to fasten boards or slats in any orientation with respect to one another, as each application may demand.

Figure 3:
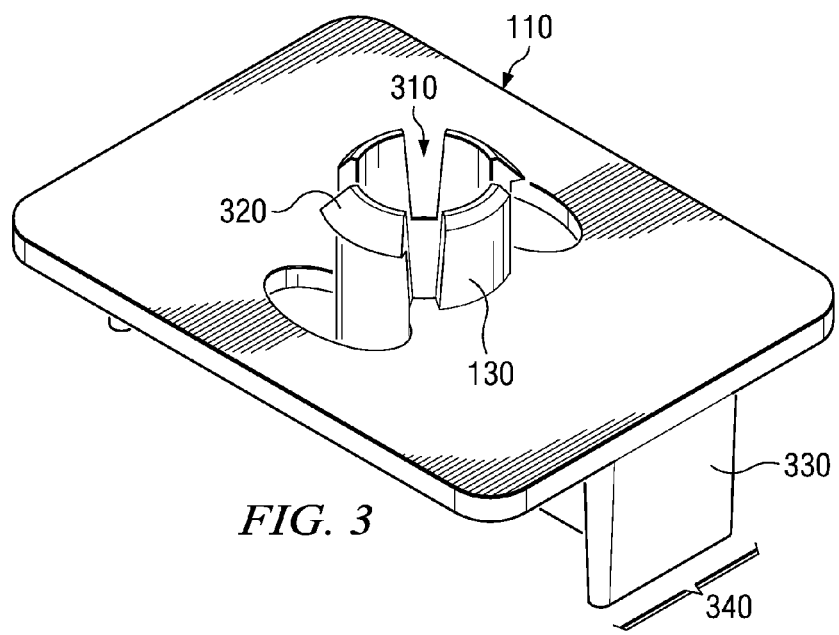
FIG. 3 illustrates an isometric view of the top of the base portion 110 shown in FIGS. 1 and 2.

FIG. 3 illustrates an isometric view of the top of the base portion 110 shown in FIGS. 1 and 2. This view illustrates the "T-shape" of the base portion 110, wherein the cap portion 120 is placed over the base portion 110 during use of the fastener 100. A passage 310 through the base portion 110 serves as a guide for the screw 150 so that it is directed in a level position into the underlying joist 220. An upper securing lip 320 at an end of the extension 130 of the base portion 110 snaps into the opening 140 in the cap portion 120, thus connecting the two portions 110, 120 as one during use of the fastener 100.

The base portion 110 includes legs 330 extending downward from a surface of the base portion 110 that is opposite to the extension 130. In exemplary embodiments, the legs 330 extend about 0.188 inches down from upper surface of the base portion 110, but any other advantageous length for the legs 330 may also be used. In addition, the thickness of the legs 330 may be selected such that they rigidly extend from the base portion 110, and thus do not easily bend or collapse during use of the fastener 100.

Figure 4:
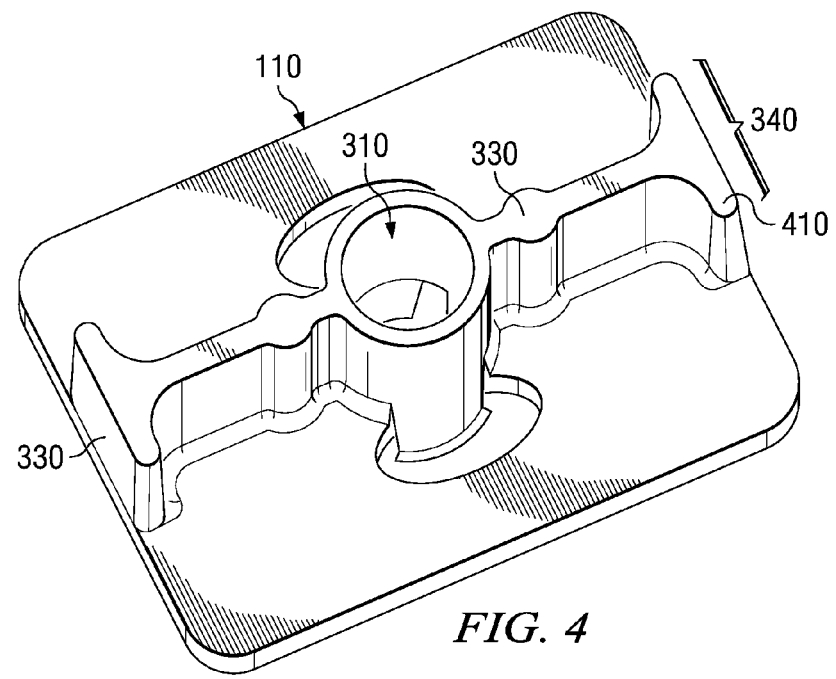
FIG. 4 illustrates an isometric view of the underside of the base portion 110 shown in FIG. 3.

The legs 330 may include two outward surfaces on each side of the vertical portion of the legs 330 to create a "crush zone" 340. FIG. 4 illustrates an isometric view of the underside of the base portion 110 shown in FIG. 3. From this view, the extending legs 330 can be seen more easily, as can the extending portions (one of which is labeled 410) creating the crush zones 340. The extending portions creating the crush zone 340 provide an advantageous feature. Specifically, the extending portions creating the crush zones 340 are typically constructed from a malleable yet firm material, and can therefore somewhat collapse in the case of the deck boards expanding in towards the center of the installed fastener 100. For example, changes in the weather, typically fluctuations between extreme hot and cold temperatures, can cause the wood (or other material) of the deck boards 210 to expand or contract accordingly. When this occurs, the outer most edges of the deck boards 210 may swell and move towards the fastener 100, compressing it, even though the outer edges of the cap portion 120 originally held the spacing between unexpanded deck boards 210. Some conventional fasteners are too brittle to withstand such constriction, and thus may break and fail, leaving deck boards loose and unsecured. Other conventional fasteners are too sturdy and will resist such constriction. In decks with such overly firm conventional fasteners, the edges of the deck boards may crack and split from pressing against such stiff fasteners, resulting in a poor appearance in these areas of the deck.

Exemplary materials for constructing the base portion 110, and in particular, the crush zones 340, include various types of plastics and polymers. For example, polyethylene or other polymer may be used to manufacture the base portion 110. Of course, other types of materials may also be used that can provide the advantageous structure and function of a fastener 100 constructed according to the disclosed principles. Processes for constructing the base portion 110 include an injection molding process, for example, if a plastic or other similar material is used. Of course, other manufacturing process for the base portion 110 may also be used. In addition, exemplary embodiments of the fastener 100 provide the width of the crush zone 340 at about 0.225 inches, but of course any advantageous width may be used.

Figure 5:
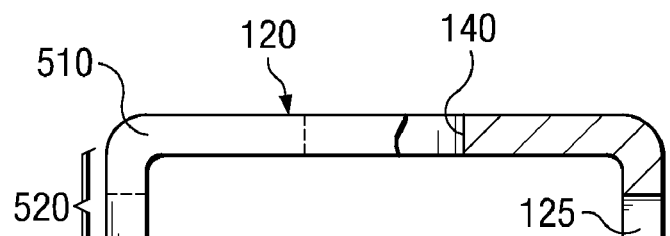
FIG. 5 illustrates a front view of one embodiment of the cap portion of a fastener 100 constructed according to the disclosed principles.

FIG. 5 illustrates a front view of one embodiment of the cap portion 120 of a fastener 100 constructed according to the disclosed principles. In exemplary embodiments, the cap portion 120 is constructed as a U-shaped "cap" that is fitted over the T-shaped base portion 110. As shown, the outward ends of the cap portion 120 may be curled in a 90 degree downward position with four (although other numbers of teeth may be used) serrated vertical teeth 125 or barbs cut into the edges, or otherwise extending therefrom. As illustrated, the teeth 125 may be made to have a triangular shape, with a sharp point at the end of each tooth 125 to bite into the material of the decking boards 210. Other shapes for the teeth 125 are also envisioned, as are the inclusion to two or more points on each tooth 125.

As described above, as the screw 150 is tightened into the joist 220, the cap portion's 120 teeth 125 embed into internal surfaces 240 of each groove 230 on both side edges of the decking boards 210 being installed. Because the cap portion 120 is used to bite into and hold the decking boards 210 against the joist 220, in advantageous embodiments, the cap portion 120 may be constructed of metal. For example, stainless steel may be used to form the cap portion 120, so that the fastener 100 does not rust in the face of the years of inclement weather to which the finished deck will likely be subjected. Of course, other types of metal, such as titanium, zinc-coated steel, etc. may also be used for the cap portion 120. In addition, other non-metallic sturdy materials may also be used for the cap portion 120, and thus no limitation to any particular construction materials is intended or should be implied.

To manufacture the U-shaped cap portion 120, the metal (or other suitable selected material) may be manufactured using a punch-press operation. Such an operation cuts the cap portion body 510, leg extensions 520, a reinforced area 530 (described further below), and the teeth 125 on the extensions 520 in a single "stamp" movement, and also bends the extensions 520 so that the extensions 520 are parallel to each other, and each is bent to about 90° with respect to the cap portion body 510. Furthermore, the opening 140 through the cap portion 120 is also cut during the punch-press operation. Of course, other techniques for manufacturing the cap portion 120 may also be employed. Having the extensions 520 bent downward at 90° from the cap portion body 510 allows the cap portion 120 to "cup" around the base portion 110 when the fastener 100 is assembled together for use. Additionally, the cap portion 120 snaps onto the base portion 110 by having the extension 130 of the base portion 120 (and its accompanying upper lip 320) pass through the opening 140 in the cap portion body 510.

Moreover, although the cap portion 120 is illustrated in the figures as having four teeth 125, it should be understood that any number of teeth 125 may be formed in the cap portion 120 to engage the grooves of the deck boards 210 being installed. In addition, such teeth 125, while illustrated as substantially triangular in shape in the figures, may be formed in any advantageous shape, as desired.

Figure 6:
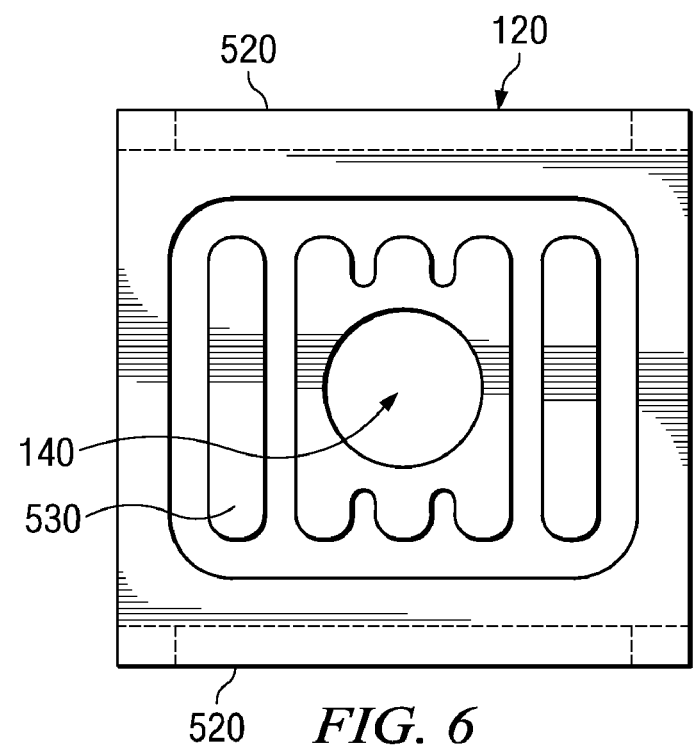
FIG. 6 illustrates a plan view of the top of the cap portion illustrated in FIG. 5.

The cap portion 120 of the deck board fastener 100 may also include a reinforced area 530 across the cap portion body 510. FIG. 6 illustrates a plan view of the top of the cap portion 120 illustrated in FIG. 5, which illustrates the reinforced area 530. The reinforced area 530 of the cap portion 120 may be included in the fastener 100 to increase the strength of the cap portion 120. More specifically, as the screw 150 is tightened down onto the fastener 100, the head of the screw 150 will eventually bear down on the cap portion 120 as the teeth 125 of the cap portion 120 are forced down into the material of the deck boards 210. The reinforced area 530 keeps the top surface of the cap portion 120 resilient against the downforce of the screw head, thus resisting bending of the cap portion 120 during use of the fastener 100. In addition, by resisting bending of the cap portion 120, the integrity of the base portion 110, which is usually less strong than the cap portion 120, is also maintained so that the base portion 110 does not easily bend or break under the downward pressure of the screw 150.

In the illustrated embodiment, the reinforce area 530 is comprised of a "ribbed" surface 530. In such embodiments, the punch-press operation discussed above can also simultaneously impress the ribbed surface 530 into the top of the cap portion 120. The impressed ribbed features on the top surface provide the additional strength in the cap portion 120 described above. Of course, other embodiments may include different or additional reinforcement features in the cap portion 120, and no limitation to any one design is intended.

While various embodiments of the disclosed principles have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method of securing slats to a support, the method comprising:
    laying slats to be secured to a support adjacent to one another, edges of the slats comprising grooves formed therein;
    providing a fastener for securing the slats to the support, the fastener comprising:
        a base portion including an opening formed therethrough for receiving a securing device, and legs extending from an upper surface of the base portion, and
        a cap portion on the upper surface of the base portion, the cap portion including an opening for receiving the securing device therethrough, and legs extending around the base portion and comprising teeth extending therefrom;
    placing the extending legs of the base portion between edges of the adjacent slats to define a spacing between the adjacent slats;
    positioning the legs of the cap portion within the grooves formed in the edges of the slats;
    inserting the securing device through the openings in the cap portion and in the base portion; and
    driving the securing device into the support and thereby against the cap portion to cause the teeth to bite into inner surfaces of the grooves to secure the slats to the support.

2. A method according to claim 1, wherein the cap portion comprises a metal material.

3. A method according to claim 1, wherein the base portion comprises plastic.

4. A method according to claim 1, further comprising securing the base portion to the cap portion by placing an extension from the surface of the base portion into the opening in the cap portion.

5. A method according to claim 4, wherein a top edge of the extension from the surface of the base portion comprises a retaining ring having an outer diameter larger than a diameter of the opening in the cap portion for snapping the cap portion to the base portion.

6. A method according to claim 1, wherein the cap portion comprises a reinforced area causing the cap portion to resist flexing.

7. A method according to claim 6, wherein the reinforced area comprises ribs pressed into an upper surface of the cap portion.

8. A method according to claim 1, wherein laying slats to be secured to a support adjacent to one another comprises laying the slats parallel to each other along their lengths.

9. A method according to claim 1, wherein a spacing between the adjacent slats is provided by outer edges of the legs of the cap portion.

10. A decking assembly, comprising:
    a support joist;
    adjacent deck boards to be secured to the support joist, edges of the deck boards comprising grooves formed therein; and
    a fastener for securing the deck boards to the support joist, the fastener comprising:
        a base portion, including:
            an opening formed therethrough for receiving a securing device, and
            legs extending from an upper surface of the base portion and between edges of the adjacent deck boards to define a spacing between the adjacent deck boards; and
        a cap portion on the upper surface of the base portion, the cap portion including:
            an opening for receiving the securing device therethrough to secure the fastener to the support joist, and
            legs extending around the base portion and comprising teeth extending therefrom, the legs positioned within the grooves formed in the edges of the deck boards and the teeth biting into inter surfaces of the grooves when the securing device secures the fastener to the support joist.

11. A decking assembly according to claim 10, wherein the legs extending from the upper surface of the base portion provide a crush zone between the edges of the adjacent deck boards, the crush zone partially collapsing when the adjacent deck boards shift towards each other.

12. A decking assembly according to claim 10, wherein the cap portion comprises a metal material.

13. A decking assembly according to claim 10, wherein the base portion comprises plastic.

14. A decking assembly according to claim 10, wherein the opening in the cap portion receives an extension from the surface of the base portion to secure the cap portion to the base portion.

15. A decking assembly according to claim 14, wherein a top edge of the extension from the surface of the base portion comprises a retaining ring having an outer diameter larger than a diameter of the opening in the cap portion for snapping the cap portion to the base portion.

16. A decking assembly according to claim 10, wherein the cap portion comprises a reinforced area causing the cap portion to resist flexing when the securing device secures the fastener to the support joist.

17. A decking assembly according to claim 16, wherein the reinforced area comprises ribs pressed into an upper surface of the cap portion.

18. A decking assembly according to claim 10, wherein the adjacent deck boards are parallel to each other along their lengths.

19. A decking assembly according to claim 10, wherein a spacing between the adjacent decking boards is provided by outer edges of the legs of the cap portion.

* * * * *